(12) United States Patent
Tanaka

(10) Patent No.: US 6,208,855 B1
(45) Date of Patent: Mar. 27, 2001

(54) MOBILE DATA COMMUNICATION SYSTEM

(75) Inventor: Masahiko Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/124,106

(22) Filed: Jul. 29, 1998

(30) Foreign Application Priority Data

Jul. 29, 1997 (JP) .................................................. 9-203079

(51) Int. Cl.[7] ...................................................... H04Q 7/20
(52) U.S. Cl. ........................... 455/422; 455/62; 455/67.3; 455/513
(58) Field of Search .............................. 455/422, 59, 101, 455/102, 103, 17, 423, 501, 503, 513, 67.3, 63, 62

(56) References Cited

U.S. PATENT DOCUMENTS

| 4,355,411 | * | 10/1982 | Reudink et al. | 455/437 |
| 5,345,600 | | 9/1994 | Davidson . | |
| 5,663,990 | * | 9/1997 | Bolgiano et al. | 375/347 |
| 5,915,210 | * | 6/1999 | Cameron et al. | 455/59 |
| 5,930,248 | * | 7/1999 | Langlet et al. | 455/503 |
| 5,993,421 | * | 8/1999 | Alamouti et al. | 370/330 |

FOREIGN PATENT DOCUMENTS

| 60-148238 | 8/1985 | (JP) . |
| WO88/04496 A1 | 6/1988 | (WO) . |

* cited by examiner

*Primary Examiner*—Thanh Cong Le
*Assistant Examiner*—Thuan T. Nguyen
(74) *Attorney, Agent, or Firm*—Scully, Scott, Murphy & Presser

(57) ABSTRACT

In data transmission from a base station to a mobile station, a received signal strength is monitored at the base station and the mobile station and, when the received signal strength reduces to less than a predetermined level, the base station concurrently transmits a plurality of radio signals each having a different frequencies and conveying the same data. At the mobile station, the original data is reproduced from the radio signals received from the base station.

33 Claims, 6 Drawing Sheets

MOBILE DATA COMMUNICATION SYSTEM

BACKGROUND OF THE INVENTION

1. Field of the Invention

The present invention relates to a mobile data communication system and, particularly, to a system and method for transmitting data from a base station to a mobile terminal.

2. Description of the Prior Art

Recently, a mobile telephone system has been used for not only telephony but data communication. For example, there have been commercially available a mobile data communication device which is detachably connected to the mobile telephone terminal and a mobile terminal integrating a telephone terminal with a mobile data communication terminal.

In general, such a mobile terminal is battery-powered and it is desirable that its power consumption is as small as possible. For this purpose, the transmission power of a mobile terminal is smaller than that of a base station. To achieve balanced received signal strength at either side of the mobile terminal and the base station, it is necessary to provide the base station with a high-gain antenna placed at a high position such as the rooftop of a building. However, it is clearly found that there are the limitations of the antenna of a base station in gain and installation height.

Therefore, it is necessary for a mobile terminal to increase its transmission power to same extent. For instance, a transmission power of 1 Watt is needed. The increased transmission power causes the size of a power IC and its heat sink and further the capacity of a battery to be large, resulting in difficulty in miniaturization. In other words, there has been a tradeoff between miniaturization and transmission power.

In such a condition, movement of a mobile terminal causes a received signal strength to fluctuate at either side of the base station and the mobile station. When the received signal strength is reduced, especially in the case of the mobile terminal located at an end of a radio zone formed by the base station, the radio communication channel is disconnected. Further multipath fading also causes a significant fluctuation of received signal strength which would result in channel disconnection.

To avoid such undesired channel disconnection, there has been proposed a polling communication method in Japanese Patent Unexamined Publication No. 60-148238. According to the conventional method, a stationary station optimally selects an antenna and a use frequency for each mobile terminal to improve the quality of channel transmission.

However, even when the antenna and the use frequency is optimally selected, the influence of fading cannot be avoided. Therefore, in the case where the mobile terminal is located away from the base station and the received signal strength is weak, the occurrence of fading easily causes the communication channel to be disconnected. In other words, the operable radio zone of each base station becomes substantially smaller. Therefore, the operable service area of the mobile communication system is substantially reduced.

SUMMARY OF THE INVENTION

An object of the present invention is to provide a mobile communication system and data transmission method which can substantially enlarge the service area thereof.

Another object of the invention is to provide a mobile communication system and data transmission method which can achieve reliable data transmission from a base station to a mobile terminal.

According to an aspect of the present invention, in data transmission from a base station to a mobile station in a mobile communication system, the method is comprised of the steps of a) preparing a plurality of predetermined frequencies;

b) monitoring a received signal strength in at least one side of the base station and the mobile station; and c) concurrently transmitting a plurality of radio signals from the base station to the mobile station when the received signal strength reduces to less than a predetermined level, wherein each of the radio signals has a different one of the predetermined frequencies and conveys the same data.

According to another aspect of the present invention, the method is further comprised of d) monitoring quality of the data conveyed by the radio signals at the mobile station; and e) transmitting a radio retransmission signal from the base station to the mobile station when the radio retransmission signal conveys a part of the data of a quality lower than a predetermined quality level.

As described above, a plurality of radio signals each conveying the same data are concurrently transmitted from the base station to the mobile station when the received signal strength is weak as in the case where the mobile station is located away from the base station. Therefore, even when multipath fading occurs, it is hard to disconnect the communication channel, resulting in substantially enlarged service area of the mobile communication system.

Further, since erroneously received data is retransmitted, reliable data transmission can be achieved.

DESCRIPTION OF THE PREFERRED EMBODIMENTS

System

Figure 1:
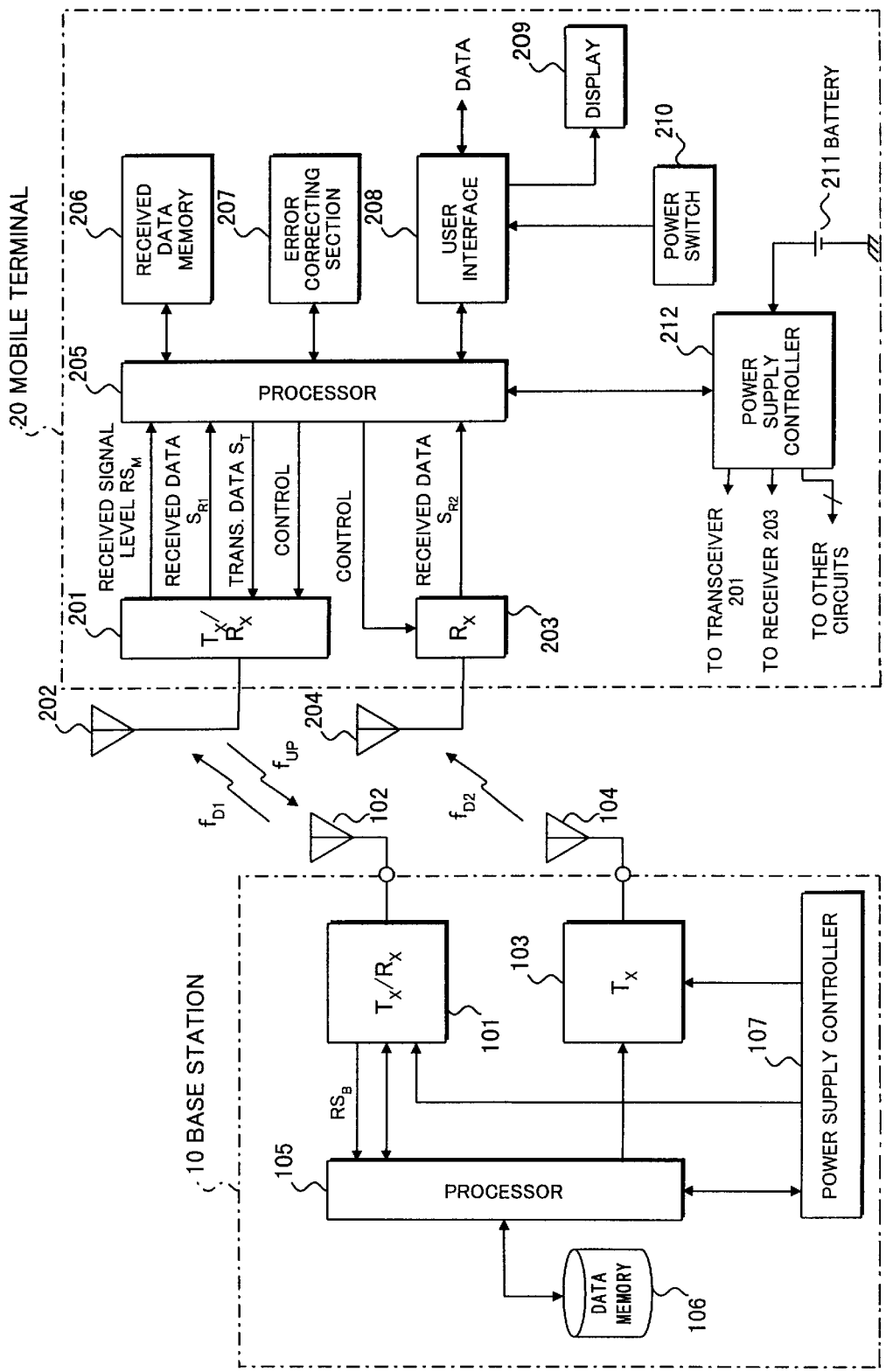
FIG. 1 is a schematic block diagram showing a system configuration of a mobile data communication system according to the present invention.

Referring to FIG. 1, a mobile data communication system is composed of a plurality of base stations and mobile terminals. The respective base stations form radio zones in cellular configuration to form a service area of the system. Each mobile terminal located within the radio zone of a base station can communicate with that base station by radio. Hereinafter, the case where a base station 10 forms a radio zone in which a mobile terminal 20 is located and communicated with the base station 10 will be described for simplicity.

Schematically, the base station 10 is composed of a transceiver 101 connected to an antenna 102 and a transmitter 103 connected to an antenna 104. The transceiver 101 transmits a base-to-mobile radio signal of frequency $f_{D1}$ to the mobile terminal 20 and receives a mobile-to-base radio signal of frequency $f_{UP}$ from the mobile terminal 20. The transmitter 103 transmits a base-to-mobile radio signal of frequency $f_{D2}$ to the mobile terminal 20. Further, the transceiver 101 detects a received signal strength $RS_B$ from the received radio signal of frequency $f_{UP}$ to output it to a processor 105 which controls the operations of the base station 10.

There is provided a frequency difference between the base-to-mobile frequency channels: $f_{D1}$ and $f_{D2}$, so that the occurrence of multipath fading has little effect on either of the frequency channels to keep its receive sensitivity acceptable. These frequencies are selected from predetermined frequency bands assigned to the system The processor 105 is connected to a data memory 106 for storing data to be transmitted. The data stored in the data memory 106 is processed by the processor 105 and then is transferred to the transceiver 101. The transceiver 101 modulates a carrier of the frequency $f_{D1}$ depending on the data to produce the base-to-mobile radio signal.

The transmitter 103 is activated when necessary. When activated, the transmitter 103 receives the same data as the transceiver 101 from the processor 105 and modulates a carrier of the frequency $f_{D2}$ depending on the data to produce another base-to-mobile radio signal.

The internal circuits including the transceiver 101 and the transmitter 103 are supplied with power as necessary by a power supply controller 107 under the control of the processor 105. More specifically, power is normally supplied to the transceiver 101 and, when receive-only mode communication of the mobile terminal 20 is started, power is supplied to both the transceiver 101 and the transmitter 103. The processor 105 runs a control program stored in a read-only memory (not shown) to perform the receive-only mode communication with the mobile terminal 20 and then to perform retransmission of erroneously transmitted data, as will be described later.

The mobile terminal 20 is composed of a transceiver 201 connected to an antenna 202 and a receiver 203 connected to an antenna 204. The transceiver 201 transmits the mobile-to-base radio signal of frequency $f_{UP}$ to the base station 10 and receives the base-to-mobile radio signal of frequency $f_{D1}$ from the base station 10. The receiver 203 receives the base-to-mobile radio signal of frequency $f_{D2}$ from the base station 10. Further, the transceiver 201 detects a received signal strength $RS_M$ from the received radio signal of frequency $f_{D1}$ to output it to a processor 205 which controls the operations of the mobile terminal 20.

More specifically, the transceiver 201 demodulates a base-to-mobile radio signal of the frequency $f_{D1}$ to output received data $S_{R1}$ and its signal strength $RS_M$ to the processor 205. Further, the transceiver 201 modulates a carrier depending on transmission data $S_T$ received from the processor 205 to produce the mobile-to-base radio signal of the frequency $f_{UP}$. The transmit/receive timing is controlled by the processor 205. For example, the well-known TDMA/TDD scheme may be used in the system. On the other hand, the receiver 203 demodulates a base-to-mobile radio signal of the frequency $f_{D2}$ to output received data $S_{R2}$ to the processor 205. As described before, the base-to-mobile radio signal of the frequency $f_{D2}$ conveys the same data as the base-to-mobile radio signal of the frequency $f_{D1}$ received by the transceiver 201. The receive timing of the receiver 203 is also controlled by the processor 205.

The processor 205 is connected to a received data memory 206 and an error correcting section 207 which may be implemented with error correcting program running on the processor 203. As will be described later, in the case where the mobile terminal 20 is set to the receive-only mode, the processor 205 stores the received data $S_{R1}$ and $S_{R2}$ in frames onto the received data memory 206 and then performs the error correcting to produce error rates $ER_1$ and $ER_2$ of the received data $S_{R1}$ and $S_{R2}$ in frames. The error rates $ER_1$ and $ER_2$ are used to select better received data.

The mobile terminal 20 is further provided with a user interface 208 which controls a display 209 such as LCD, a keypad for data and instruction input, and communication with external equipment such as a personal computer which is detachably connected by an external connector. The keypad includes a power switch 210 which is used by a user to power the mobile terminal 20 on and off.

The mobile terminal 20 is powered by a battery 211. A power supply controller 212 supplies the battery power to the transceiver 201, the receiver 203 and other necessary circuits under control of the processor 205. In normal receive mode, the processor 205 controls the power supply controller 212 so that the power is not supplied to the receiver 203 but to the transceiver 201 to perform normal communication with the base station 10. When the radio channel is impaired, at a request of the mobile terminal 20 or on the instruction of the base station 10, the mobile terminal 20 changes from the normal receive mode to the receive-only mode.

In the receive-only mode, the processor 205 controls the power supply controller 212 so that the power is supplied to both the receiver 203 and the transceiver 201 to receive the same data from the base station 10 through two different frequency channels. In other words, the respective base-to-mobile signals of frequencies $f_{D1}$ and $f_{D2}$ are concurrently received by the transceiver 201 and the receiver 203. Further, in the receive-only mode, the processor 205 controls the user interface 208 so that an indicator of the receive-only mode is displayed on the display 209 and the power switch 210 is inoperative.

Communication Control

In the case where the mobile terminal 20 operates in the receive-only mode, the transceiver 201 and the receiver 203 are both activated to concurrently receive the same data from the base station 10 through the two different frequency channels. The mobile terminal 20 switches to the receive-only mode in one of the following ways: 1) Base-initiated sequence and 2) mobile-initiated sequence. In the base-initiated sequence, at the base station 10, when the received signal strength $RS_B$ falls to less than a predetermined threshold $TH_{RSB}$, a receive-only mode switch instruction is transmitted from the base station 10 to the mobile terminal 20. In the mobile-initiated sequence, at the mobile terminal 20, when the received signal strength $RS_M$ falls to less than a predetermined threshold $TH_{RSM}$, a receive-only mode switch request is transmitted from the mobile terminal 20 to the base station 10 and then the receive-only mode switch permission is transmitted back to the mobile terminal 20. The details will be described hereinafter.

Base-Initiated Sequence

Figure 2:
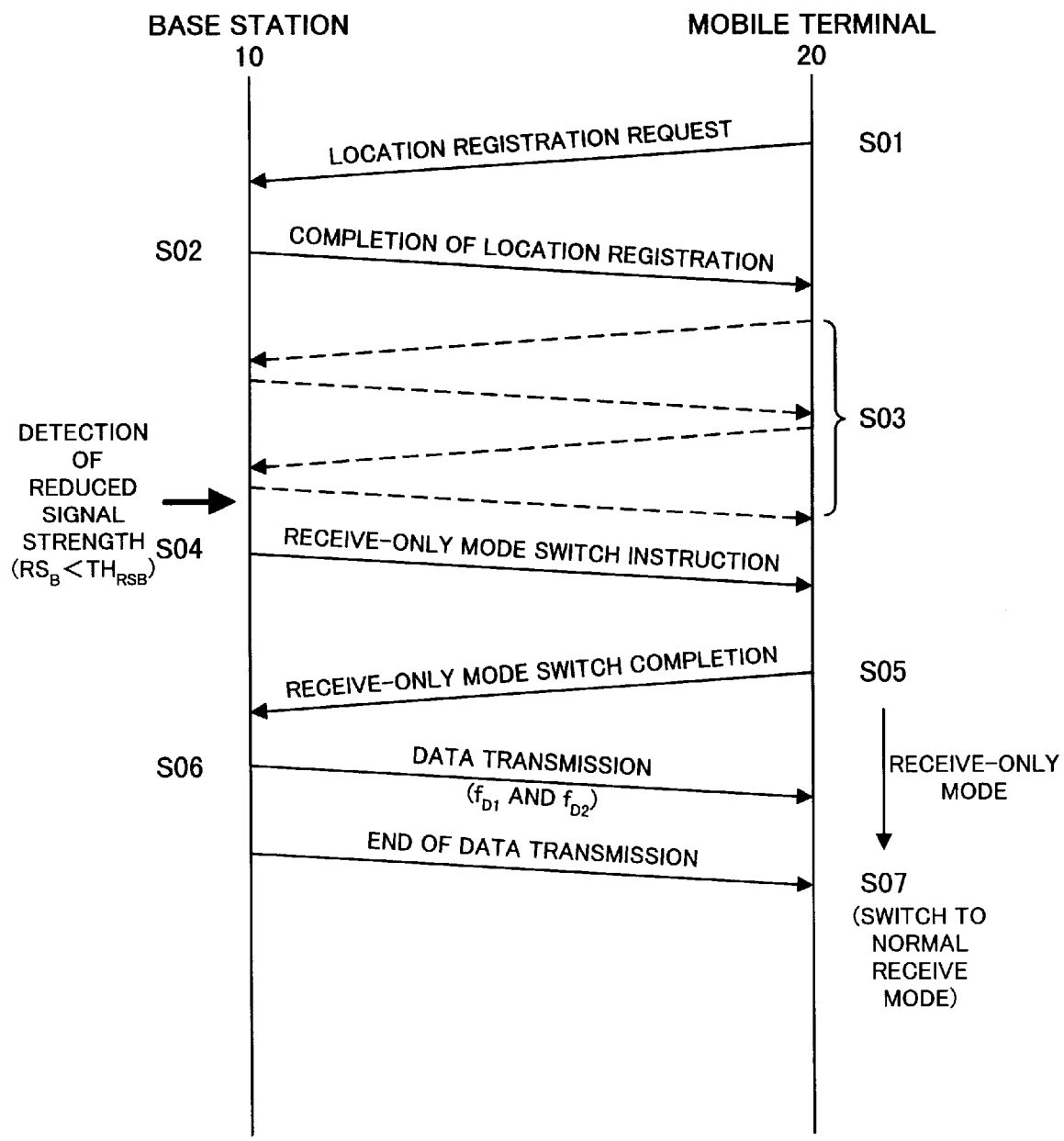
FIG. 2 is a sequence diagram showing a receive-only mode operation initiated by the base station in a data communication method according to a first embodiment of the present invention.

Referring to FIG. 2, first of all, when the power switch 210 is turned on by the user, the processor 205 starts location registration operation. That is, a location registration signal is transmitted to the base station 10 through the transceiver 201 (step S01).

When receiving the location registration signal from the mobile terminal 20, the base station 10 performs the location registration of the mobile terminal 20 and then transmits a location registration completion signal to the mobile terminal 20 (step S02). Thereafter, the communication between the base station 10 and the mobile terminal 20 is performed using the frequencies $f_{D1}$ and $f_{UP}$ (step S03).

During the location registration or thereafter communication, the processor 105 of the base station 10 monitors the received signal strength $RS_B$ at all times. When it is determined that the received signal strength $RS_B$ falls to less than the predetermined threshold $TH_{RSB}$, which may be caused by multipath fading or the mobile terminal 20 moving to the end of the radio zone, the processor 105 produces a receive-only mode switch instruction and transmits it to the mobile terminal 20 through the transceiver 101 (step S04).

Upon receipt of the receive-only mode switch instruction, the processor 205 of the mobile terminal 20 switches the communication mode from the normal mode to the receive-only mode in which the transceiver 201 receives the base-to-mobile signal of the frequency $f_{D1}$ and at the same time the receiver 203 receives the base-to-mobile signal of the frequency $f_{D2}$ from the base station 10. After having switched to the receive-only mode, a receive-only mode switch completion signal is transmitted to the base station 10 (step S05).

The processor 105 of the base station 10, when receiving the receive-only mode switch completion signal from the mobile terminal 20, starts receive-only mode transmission. More specifically, the same data to be transmitted is output to both the transceiver 101 and the receiver 103 which concurrently transmit the two base-to-mobile radio signals to the mobile terminal 20 through the two frequency channels of $f_{D1}$ and $f_{D2}$, respectively (step S06).

The mobile terminal 20 receives the two base-to-mobile radio signals of the frequencies $f_{D1}$ and $f_{D2}$ from the base station 10 in the receive-only mode. It is preferably that an indicator of the receive-only mode is displayed on the display 209 to inform the user. Further, during the receive-only mode, the power switch 210 is preferably inoperative to prevent accidental power-off.

When the data transmission in the receive-only mode has been terminated, the base station 10 transmits a data transmission completion signal to the mobile terminal 20. When detecting the end of the data transmission, the processor 205 switches the communication mode from the receive-only mode to the normal mode (step S07).

Mobile-Initiated Sequence

Figure 3:
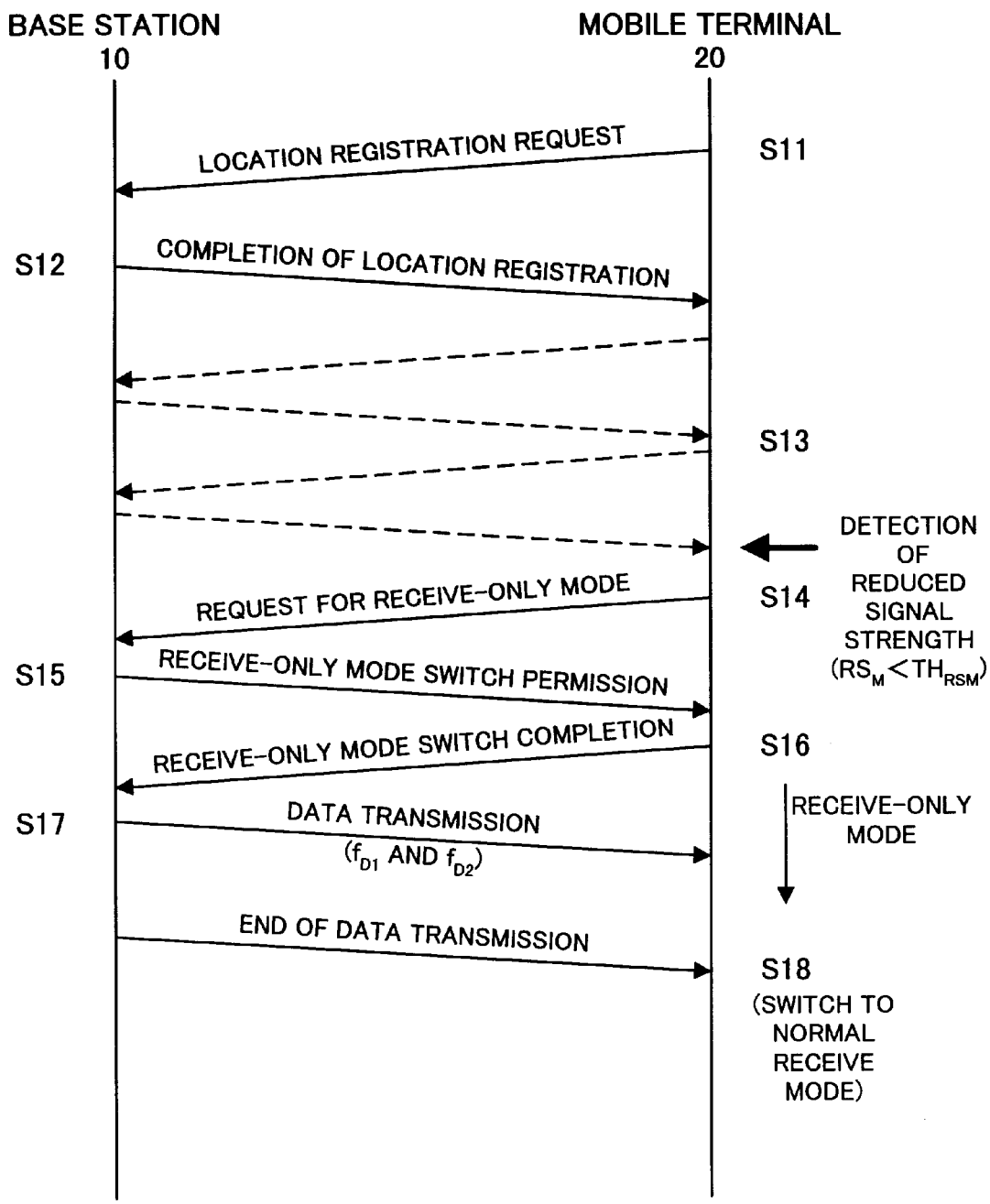
FIG. 3 is a sequence diagram showing a receive-only mode operation initiated by the mobile terminal in the data communication method according to the first embodiment.

Referring to FIG. 3, the descriptions of steps S11–S13 are omitted because they are the same as the steps S01–S03 of FIG. 2.

During the location registration or thereafter communication, the processor 205 of the mobile terminal 20 monitors the received signal strength $RS_M$ at all times. When it is determined that the received signal strength $RS_M$ falls to less than the predetermined threshold $TH_{RSM}$, which may be caused by multipath fading or the mobile terminal 20 moving to the end of the radio zone, the processor 205 produces a receive-only mode switch request and transmits it to the base station 10 through the transceiver 201 (step S14).

In response to the receive-only mode switch request, the processor 105 of the base station 10 transmits a receive-only mode switch permission signal back to the mobile terminal (step S15).

When receiving the receive-only mode switch permission signal, the processor 205 of the mobile terminal 20 switches the communication mode from the normal mode to the receive-only mode. After having switched to the receive-only mode, a receive-only mode switch completion signal is transmitted to the base station 10 (step S16).

The processor 105 of the base station 10, when receiving the receive-only mode switch completion signal from the mobile terminal 20, starts receive-only mode transmission (step S17).

The mobile terminal 20 receives the two base-to-mobile radio signals of the frequencies $f_{D1}$ and $f_{D2}$ from the base station 10 in the receive-only mode. It is preferably that an indicator of the receive-only mode is displayed on the display 209 to inform the user. Further, during the receive-only mode, the power switch 210 is preferably inoperative to prevent accidental power-off.

When the data transmission in the receive-only mode has been terminated, the base station 10 transmits a data transmission completion signal to the mobile terminal 20. When detecting the end of the data transmission, the processor 205 switches the communication mode from the receive-only mode to the normal mode (step S18).

Receive-Only Mode

The receiving control of the receive-only mode will be described hereinafter.

Figure 4:
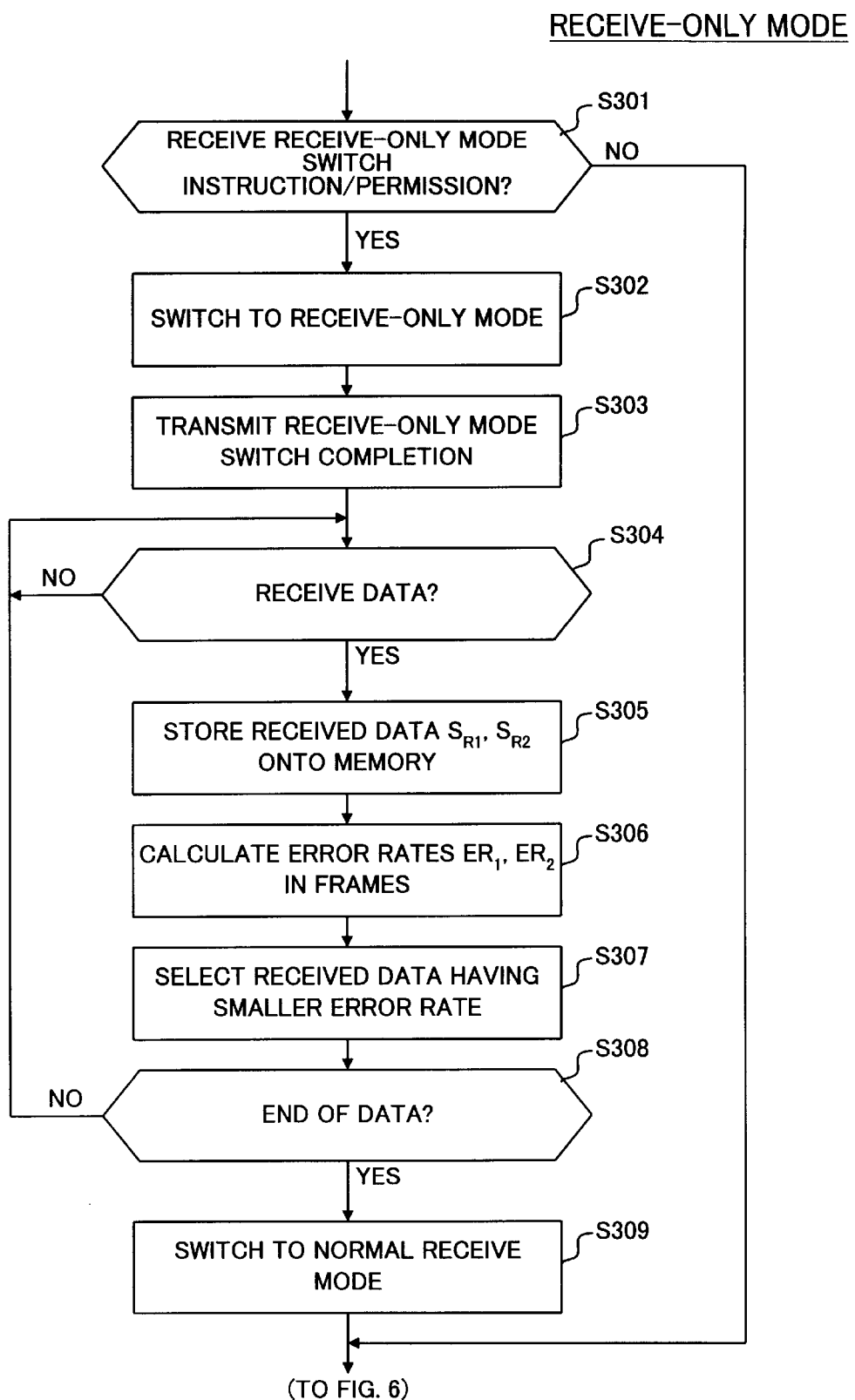
FIG. 4 is a flow chart showing a receive-only mode operation of the mobile terminal according to the first embodiment.

Referring to FIG. 4, when receiving the receive-only mode switch instruction/permission signal from the base station 10 (YES in step S301), the processor 205 of the mobile terminal 20 switches the communication mode from the normal mode to the receive-only mode (step S302). As described before, it is preferably that an indicator of the receive-only mode is displayed on the display 209 to inform the user. Further, during the receive-only mode, the power switch 210 is preferably inoperative to prevent accidental power-off. After having switched to the receive-only mode, the receive-only mode switch completion signal is transmitted to the base station 10 (step S303).

When receiving the two base-to-mobile radio signals of the frequencies $f_{D1}$ and $f_{D2}$ from the base station 10 (YES in step S304), the transceiver 201 outputs the received data $S_{R1}$ and the receiver 203 outputs the received data $S_{R2}$ to the processor 205. Since the base station 10 transmits the same data, the received data $S_{R1}$ and $S_{R2}$ are ideally identical to each other. The received data $S_{R1}$ and $S_{R2}$ are stored onto the received data memory 206 (step S305).

Subsequently, the error correcting section 207 performs the error correcting of the received data $S_{R1}$ and $S_{R2}$ in frames and produces error rates $ER_1$ and $ER_2$, respectively (step S306). The processor 205 selects one of the received data $S_{R1}$ and $S_{R2}$ depending on which error rate is smaller and the selected data is output to the external device through the user interface 208 (step S307). Since the frequencies $f_{D1}$ and $f_{D2}$ are selected so that occurrence of multipath fading has little effect on either of the frequency channels to keep its receive sensitivity acceptable, there is a high possibility that at least one of the received data $S_{R1}$ and $S_{R2}$ is acceptable.

When detecting the end of the data transmission (YES in step S308), the processor 205 switches the communication mode from the receive-only mode to the normal mode (step S309).

Data Retransmission

According to the second embodiment of the present invention, after the end of the data transmission in the receive-only mode, erroneously received data can be retransmitted in frames.

Figure 5:
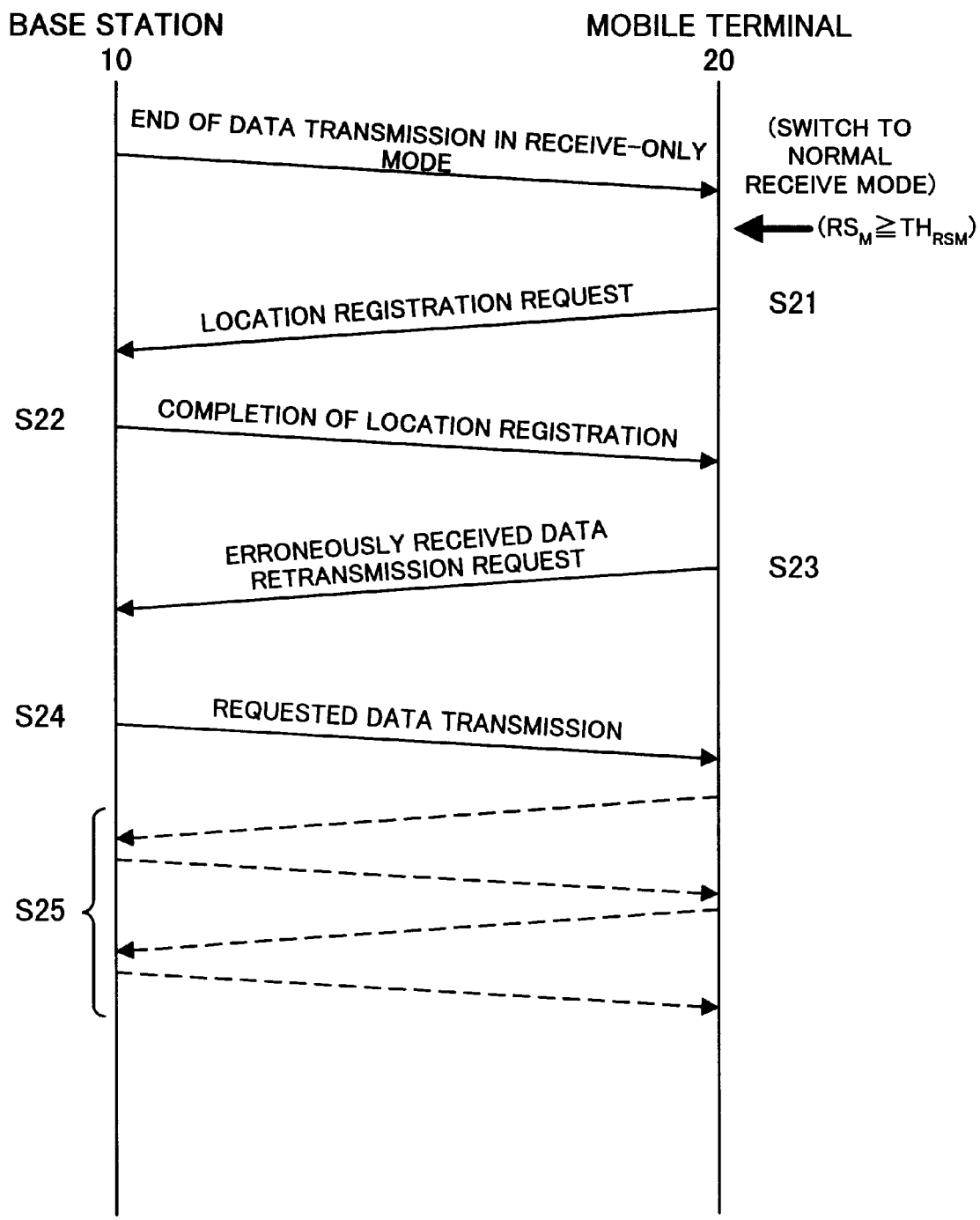
FIG. 5 is a sequence diagram showing a retransmission operation of a data communication method according to a second embodiment of the present invention.

As shown in FIG. 5, after the communication mode of the mobile terminal 20 switches from the receive-only mode to the normal mode, the processor 205 determines whether the received signal strength $RS_M$ is smaller than the predetermined threshold $TH_{RSM}$. If the received signal strength $RS_M$ is not smaller than the predetermined threshold $TH_{RSM}$, the location registration is performed again (steps S21 and S22). Subsequently, if there is frame data which fails to be received correctly, the mobile terminal 20 transmits a request for retransmission of erroneously received frame data to the base station 10 (step S23).

When receiving the retransmission request signal from the mobile terminal 20, the processor 105 of the base station 10 searches the data memory 106 for the requested frame data and transmits the requested frame data to the mobile terminal 20 (step S24). Such a retransmission steps S23 and S24 is repeatedly performed until no erroneously received frame data remain in the mobile terminal 20 (step S25).

Figure 6:
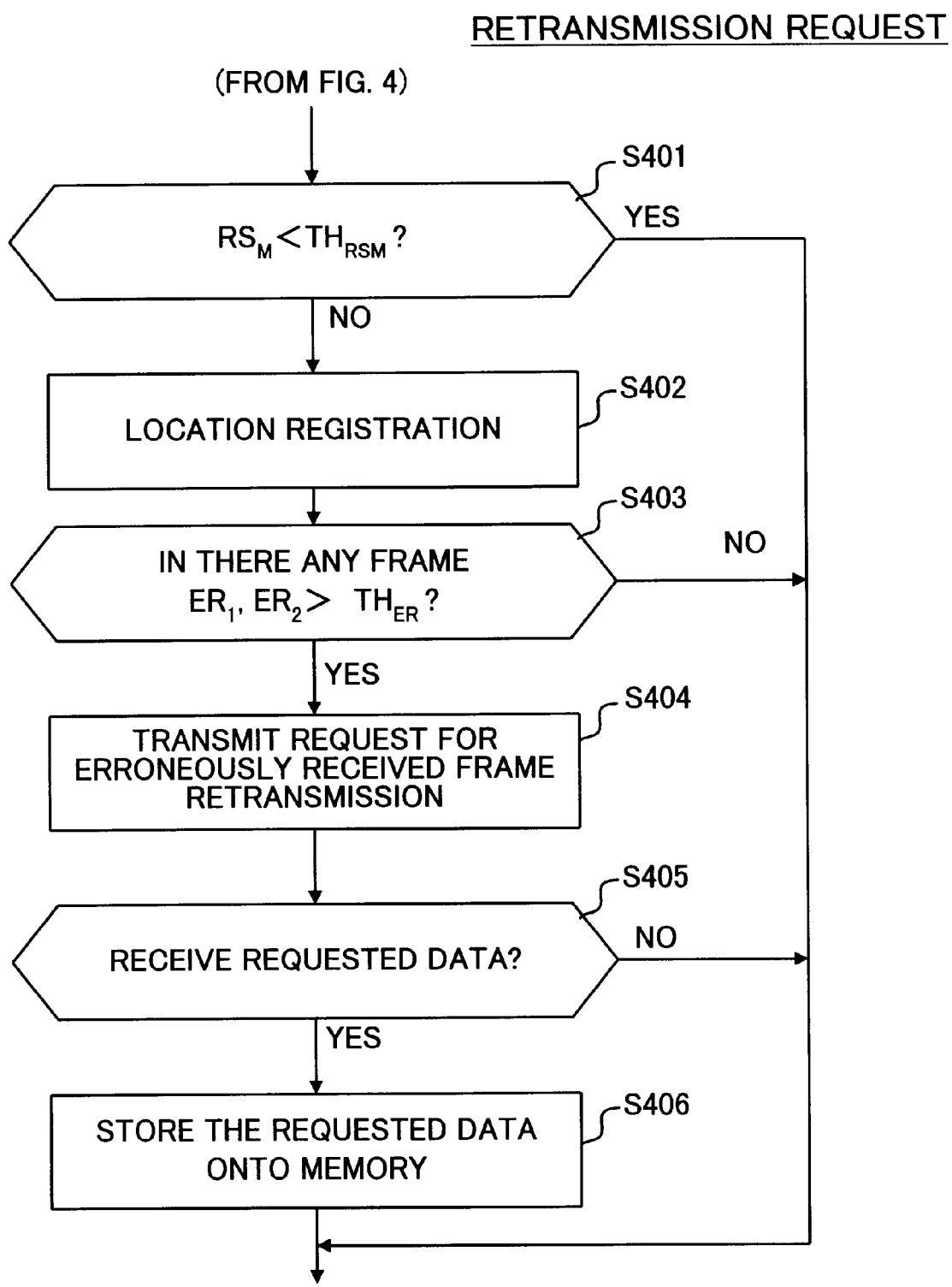
FIG. 6 is a flow chart showing the retransmission operation of the mobile terminal according to the second embodiment.

Referring to FIG. 6, after the communication mode of the mobile terminal 20 switches from the receive-only mode to the normal mode, the processor 205 determines whether the received signal strength $RS_M$ is smaller than the predetermined threshold $TH_{RSM}$ (step S401). If the received signal strength $RS_M$ is not smaller than the predetermined threshold $TH_{RSM}$ (NO in step S401), the location registration Is performed again (step S402).

Subsequently, the processor 205 determines whether there is any frame data satisfying that the error rates $ER_1$ and $ER_2$ are both higher than a predetermined threshold $TH_{ER}$ (step S403). It is determined that frame data satisfying such a condition has never been received. Therefore, if such frame data is found (YES In step S403), the retransmission request for such erroneously received data is transmitted to the base station 10 (step S404). And when receiving the requested frame data from the base station 10 (YES in step S405), the processor 205 stores the received data onto the received data memory 206 (step S406). In this manner, all the frame data can be received.

It should be noted that the communication mode can switch to the receive-only mode when the received signal strength is reduced during data retransmission as shown in FIG. 6.

The sequence as shown in FIGS. 2 and 3 may be further simplified. For example, the base station 10 can transmit the data to the mobile terminal 20 after a predetermined time interval during which the mobile terminal completely switches to the receive-only mode has elapsed since the receive-only mode switch instruction/permission. In this case, the receive-only mode switch completion signal is not needed.

Further, the present invention is not limited to the above embodiments. Three or more frequencies may be used in the receive-only mode. In this case, although both of the base station 10 and the mobile terminal 20 need three or more communication devices, more reliable data transmission can be achieved.

What is claimed is:

1. A method for transmitting data from a base station to a mobile station in a mobile communication system, comprising the steps of:

a) preparing a plurality of predetermined frequencies;

b) monitoring a received signal strength in at least one side of the base station and the mobile station;

c) concurrently transmitting a plurality of radio signals from the base station to the mobile station when the received signal strength reduces to less than a predetermined level, wherein each of the radio signals has a different one of the predetermined frequencies and conveys the same data;

d) a transceiver at the mobile station transmits a mobile-to-base radio signal of frequency $f_{up}$ to the base station and receives a base-to-mobile radio signal of frequency $f_{D1}$ from the base station, a receiver at the mobile station receives a base-to-mobile radio signal of frequency $f_{D2}$ from the base station and does not transmit a mobile-to-base radio signal, and i. in a normal receive communication mode, power is supplied to the transceiver to perform normal communications with the base station, and power is not supplied to the receiver, and ii. when radio communications through the transceiver are impaired, the mobile terminal changes from the normal receive mode to a receive-only mode in which power is supplied to both the receiver and the transceiver to receive the same data from the base station through two different frequency channels, such that base-to-mobile signals of frequencies $f_{D1}$ and $f_{D2}$ are concurrently received by the transceiver and the receiver.

2. The method according to claim 1, wherein the radio signals are concurrently transmitted when at the base station the received signal strength reduces to less than the predetermined level.

3. The method according to claim 1, wherein the radio signals are concurrently transmitted at a request of the mobile station when at the mobile station the received signal strength reduces to less than the predetermined level.

4. The method according to claim 1, wherein at the mobile station, receiving the radio signals from the base station to produce streams of received data corresponding to the radio signals, respectively; and selecting a data block of better quality from the streams of received data to reproduce original data.

5. The method according to claim 4, wherein a communication mode of the mobile station switches to a receive-only mode before the radio signals are concurrently received from the base station.

6. The method according to claim 5, wherein the communication mode of the mobile station switches to the receive-only mode on an instruction of the base station.

7. The method according to claim 5, wherein at the mobile station, transmitting a request for receive-only mode switch to the base station;

receiving receive-only mode switch permission from the base station; and switching to the receive-only mode on the receive-only mode switch permission of the base station.

8. The method according to claim 5, wherein at the mobile station, transmitting a request for receive-only mode switch to the base station; and switching to the receive-only mode.

9. The method according to claim 8, wherein at the base station, receiving the request for receive-only mode switch from the mobile station; and concurrently transmitting the radio signals to the mobile station after a predetermined time period during which the mobile station switches to the receive-only mode has elapsed since reception of the request.

10. The method according to claim 5, wherein, when the mobile station has switched to the receive-only mode, an indicator of the receive-only mode is displayed on a display device provided in the mobile station.

11. The method according to claim 5, wherein, when the mobile station has switched to the receive-only mode, a power switch provided in the mobile station is inoperative until the receive-only mode is released.

12. The method according to claim 10, wherein, when the mobile station has switched to the receive-only mode, a power switch provided in the mobile station is inoperative until the receive-only mode is released.

13. The method according to claim 1, further comprising the steps of:

d) monitoring quality of the data conveyed by the radio signals at the mobile station; and e) transmitting a radio retransmission signal from the base station to the mobile station when the radio retransmission signal conveys a part of the data of quality lower than a predetermined quality level.

14. A method for transmitting data from a base station to a mobile station in a mobile communication system, comprising the steps of:

a) preparing a plurality of predetermined frequency channels;

b) monitoring a received signal strength in at least one side of the base station and the mobile station;

at the base station, c) concurrently transmitting a plurality of radio signals to the mobile station through the predetermined frequency channels, respectively, when the received signal strength reduces to less than a predetermined level, wherein each of the radio signals conveys the same data in data blocks;

at the mobile station, d) receiving the radio signals from the base station to produce streams of received data in data blocks, the streams of received data corresponding to the radio signals, respectively;

e) determining quality of data block for each of the streams of the received data;

f) determining whether a block of low-quality data of quality lower than a predetermined quality level exists in the streams of the received data;

g) transmitting a retransmission request for the block of low-quality data to the base station when the block of low-quality data exists;

at the base station, h) transmitting a radio retransmission signal conveying data corresponding to the block of low-quality data to the mobile station;

at the mobile station, i) a transceiver at the mobile station transmits a mobile-to-base radio signal of frequency $f_{up}$ to the base station and receives a base-to-mobile radio signal of frequency $f_{D1}$ from the base station, a receiver at the mobile station receives a base-to-mobile radio signal of frequency $f_{D2}$ from the base station and does not transmit a mobile-to-base radio signal, and i. in a normal receive communication mode, power is supplied to the transceiver to perform normal communications with the base station, and power is not supplied to the receiver, and ii. when radio communications through the transceiver are impaired, the mobile terminal changes from the normal receive mode to a receive-only mode in which power is supplied to both the receiver and the transceiver to receive the same data from the base station through two different frequency channels, such that base-to-mobile signals of frequencies $f_{D1}$ and $f_{D2}$ are concurrently received by the transceiver and the receiver.

15. The method according to claim 14, wherein, at the mobile station, the retransmission request is transmitted to the base station when the received signal strength is not smaller than the predetermined level.

16. The method according to claim 14, wherein the retransmission request is transmitted to the base station through a normally-used frequency channel.

17. A mobile communication system comprising a plurality of base stations and mobile stations, wherein a plurality of predetermined frequencies are available, a base station comprising:

at least one receiver;

a plurality of transmitters each corresponding to a different one of the predetermined frequencies; and a transmitting controller for controlling the transmitters respectively to concurrently transmit a plurality of radio signals to a mobile station communicating therewith when a received signal strength in at least one side of the base station and the mobile station reduces to less than a predetermined level; and a mobile station comprising:

at least one transmitter;

a plurality of receivers for receiving the radio signals from the base station;

a processor for producing streams of received data corresponding to the receivers, respectively;

a transceiver at the mobile station transmits a mobile-to-base radio signal of frequency $f_{up}$ to the base station and receives a base-to-mobile radio signal of frequency $f_{D1}$ from the base station, a receiver at the mobile station receives a base-to-mobile radio signal of frequency $f_{D2}$ from the base station and does not transmit a mobile-to-base radio signal, and i. in a normal receive communication mode, power is supplied to the transceiver to perform normal communications with the base station, and power is not supplied to the receiver, and ii. when radio communications through the transceiver are impaired, the mobile terminal changes from the normal receive mode to a receive-only mode in which power is supplied to both the receiver and the transceiver to receive the same data from the base station through two different frequency channels, such that base-to-mobile signals of frequencies $f_{D1}$ and $f_{D2}$ are concurrently received by the transceiver and the receiver.

18. The mobile communication system according to claim 17, wherein the base station further comprises a monitor for monitoring a received signal strength of a radio signal received from the mobile station, wherein at the base station the received signal strength reduces to less than the predetermined level.

19. The mobile communication system according to claim 17, wherein the mobile station comprises a monitor for monitoring a received signal strength of a radio signal received from the base station, wherein the base station concurrently transmits the radio signals at a request of the mobile station when at the mobile station the received signal strength reduces to less than the predetermined level.

20. The mobile communication system according to claim 17, wherein the processor switches a communication mode to a receive-only mode before the radio signals are concurrently received from the base station.

21. The mobile communication system according to claim 20, wherein the communication mode of the mobile station switches to the receive-only mode on an instruction of the base station.

22. The mobile communication system according to claim 17, wherein the processor selects a data block of better quality from the streams of received data to reproduce original data.

23. A mobile station in the mobile communication system according to claim 17, comprising:
   at least one transmitter;
   a plurality of receivers corresponding to the predetermined frequencies, wherein a predetermined one of the receivers is used for a normal receiving mode;
   a display;
   a keypad including a power switch;
   a power controller for controlling power supply of a battery; and
   a processor for reproducing original data from a plurality of streams of received data corresponding to the radio signals concurrently received by the receivers, respectively.

24. The mobile station according to claim 23, wherein the processor selects a data block of better quality from the streams of received data to reproduce the original data.

25. The mobile station according to claim 23, wherein the processor switches a communication mode of the mobile station from a normal mode to a receive-only mode before the radio signals are concurrently received from the base station, wherein the transmitter and the predetermined receiver are used to communicate with the base station in the normal mode.

26. The mobile station according to claim 25, wherein, when the mobile station has switched to the receive-only mode, the processor instructs the display to display an indicator of the receive-only mode on screen.

27. The mobile station according to claim 25, wherein, when the mobile station has switched to the receive-only mode, the processor makes the power switch inoperative until the receive-only mode is released.

28. The mobile station according to claim 26, wherein, when the mobile station has switched to the receive-only mode, the processor makes the power switch inoperative until the receive-only mode is released.

29. The mobile station according to claim 25, wherein, when in the normal mode, the processor controls the power controller so that power is supplied to the transmitter and the predetermined receiver and when in the receive-only mode, the processor controls the power controller so that power is supplied to all the receivers.

30. The mobile station according to claim 23, wherein the processor determines whether a block of low-quality data of quality lower than a predetermined quality level exists in the streams of the received data, and then controls the transmitter to transmit a retransmission request for the block of low-quality data to the base station when the block of low-quality data exists.

31. The method according to claim 1, wherein:
   in the normal receive mode, the transceiver demodulates a base-to-mobile radio signal at frequency $f_{D1}$ to output received data $S_{R1}$ to a processor,
   in the receive-only mode, the transceiver demodulates a base-to-mobile radio signal at frequency $f_{D1}$ to output received data $S_{R1}$ to a processor and additionally the receiver demodulates a base-to-mobile radio signal of the frequency $f_{D2}$ to output received data $S_{R2}$ to the processor, which conveys the same data as the base-to-mobile radio signal of the frequency $f_{D1}$ received by the transceiver, and
   when the mobile station is set to the receive-only mode, the processor stores the received data $S_{R1}$ and $S_{R2}$ in frames in a memory, and performs error correcting to produce error rates $ER_1$ and $ER_2$ of the received data $S_{R1}$ and $S_{R2}$ in frames, and the error rates $ER_1$ and $ER_2$ are used to select better received data.

32. The method according to claim 14, wherein:
   in the normal receive mode, the transceiver demodulates a base-to-mobile radio signal at frequency $f_{D1}$ to output received data $S_{R1}$ to a processor,
   in the receive-only mode, the transceiver demodulates a base-to-mobile radio signal at frequency $f_{D1}$ to output received data $S_{R1}$ to a processor and additionally the receiver demodulates a base-to-mobile radio signal of the frequency $f_{D2}$ to output received data $S_{R2}$ to the processor, which conveys the same data as the base-to-mobile radio signal of the frequency $f_{D1}$ received by the transceiver, and
   when the mobile station is set to the receive-only mode, the processor stores the received data $S_{R1}$ and $S_{R2}$ in frames in a memory, and performs error correcting to produce error rates $ER_1$ and $ER_2$ of the received data $S_{R1}$ and $S_{R2}$ in frames, and the error rates $ER_1$ and $ER_2$ are used to select better received data.

33. The mobile station according to claim 17, wherein in the mobile station:
   in the normal receive mode, the transceiver demodulates a base-to-mobile radio signal at frequency $f_{D1}$ to output received data $S_{R1}$ to a processor,
   in the receive-only mode, the transceiver demodulates a base-to-mobile radio signal at frequency $f_{D1}$ to output received data $S_{R1}$ to a processor and additionally the receiver demodulates a base-to-mobile radio signal of the frequency $f_{D2}$ to output received data $S_{R2}$ to the processor, which conveys the same data as the base-to-mobile radio signal of the frequency $f_{D1}$ received by the transceiver, and
   when the mobile station is set to the receive-only mode, the processor stores the received data $S_{R1}$ and $S_{R2}$ in frames in a memory, and performs error correcting to produce error rates $ER_1$ and $ER_2$ of the received data $S_{R1}$ and $S_2$ in frames, and the error rates $ER_1$ and $ER_2$ are used to select better received data.

* * * * *